(12) United States Patent
Wilton et al.

US010803031B1

(10) Patent No.: US 10,803,031 B1
(45) Date of Patent: Oct. 13, 2020

(54) MIGRATING DATA BETWEEN DATABASES

(71) Applicant: Amazon Technologies, Inc., Seattle, WA (US)

(72) Inventors: Jeremiah Wilton, Seattle, WA (US); Ilia Gilderman, Bellevue, WA (US); John MacDonald Winford, Vancouver (CA)

(73) Assignee: Amazon Technologies, Inc., Seattle, WA (US)

(*) Notice: Subject to any disclaimer, the term of this patent is extended or adjusted under 35 U.S.C. 154(b) by 616 days.

(21) Appl. No.: 14/985,084

(22) Filed: Dec. 30, 2015

(51) Int. Cl.
*G06F 16/30* (2019.01)
*G06F 16/21* (2019.01)
*G06F 16/25* (2019.01)

(52) U.S. Cl.
CPC .......... *G06F 16/214* (2019.01); *G06F 16/212* (2019.01); *G06F 16/258* (2019.01)

(58) Field of Classification Search
CPC ......... G06F 17/30569; G06F 17/30595; G06F 17/30286
USPC ....................................................... 707/809
See application file for complete search history.

(56) References Cited

U.S. PATENT DOCUMENTS

| | | | |
|---|---|---|---|
| 7,233,956 B2* | 6/2007 | Balducci | G06F 40/154 |
| 8,850,423 B2* | 9/2014 | Barkie | G06F 8/63 |
| | | | 717/176 |
| 9,672,054 B1* | 6/2017 | Gupta | G06F 9/45533 |
| 9,740,759 B1* | 8/2017 | Zhang | H04L 67/1095 |
| 2005/0131970 A1 | 6/2005 | Salazar et al. | |
| 2007/0203728 A1 | 8/2007 | Simon et al. | |
| 2008/0208855 A1* | 8/2008 | Lingenfelder | G06F 16/258 |
| 2010/0185637 A1* | 7/2010 | Morris | G06F 16/24556 |
| | | | 707/758 |
| 2012/0203823 A1 | 8/2012 | Manglik et al. | |
| 2013/0013967 A1* | 1/2013 | Gokhale | G06F 16/214 |
| | | | 714/57 |
| 2014/0317617 A1* | 10/2014 | O'Donnell | G06F 9/5027 |
| | | | 718/1 |

(Continued)

OTHER PUBLICATIONS

Office action for U.S. Appl. No. 14/985,132 dated Apr. 12, 2018, Wilton et al., "Migrating Data Between Databases", 16 pages.

*Primary Examiner* — Hosain T Alam
*Assistant Examiner* — Robert F May
(74) *Attorney, Agent, or Firm* — Lee & Hayes, P.C.

(57) ABSTRACT

Data is migrated between a source database and a target database. The source database management system ("DBMS") remains operational during the migration. A user selects the source DBMS and target DBMS, provides connection information used to connect to the database management systems and selects a virtual machine instance to perform the migration in conjunction with a database migration service. After the setup is complete, the virtual machine instance in conjunction with the database migration service performs data type transformations, and other operations, without user intervention. The database migration service also converts, without user intervention, the source schema and code to a format compatible with the target DBMS. Any code that is not converted is marked to assist the user of the database migration service identify where manual re-coding is required. The database migration service can also provide recommendations as to a target DBMS that is a suitable target DBMS.

20 Claims, 10 Drawing Sheets

(56) References Cited

U.S. PATENT DOCUMENTS

| | | | |
|---|---|---|---|
| 2015/0019197 A1* | 1/2015 | Higginson | G06F 30/20 703/22 |
| 2015/0019488 A1* | 1/2015 | Higginson | G06F 16/214 707/634 |
| 2017/0052970 A1* | 2/2017 | Crabtree | G06F 8/315 |

* cited by examiner

MIGRATING DATA BETWEEN DATABASES

BACKGROUND

Many different types of entities store data in databases. Databases provide an organized collection of data and include schemas, tables, queries, reports, views and other objects. There are many different database management systems ("DBMS") available for use that create and manage databases. Customers may use different schema and code, including views, stored procedures and functions, to interact with databases. In some cases, an entity may want to migrate data from one database to another. For example, a company may want new or different features associated with a particular type of database and/or the company may want to transition the database to an off premise network.

In some cases, it can be very difficult and time-consuming to migrate data between different databases. For example, the source database and a target database may use different schemas, different formats for schema objects, as well as different syntax and language structures for the code used in stored procedures and functions. Converting the schema used by the source database into a format that is compatible with the target database and migrating the data can be very expensive and time consuming.

DETAILED DESCRIPTION

Figure 1:
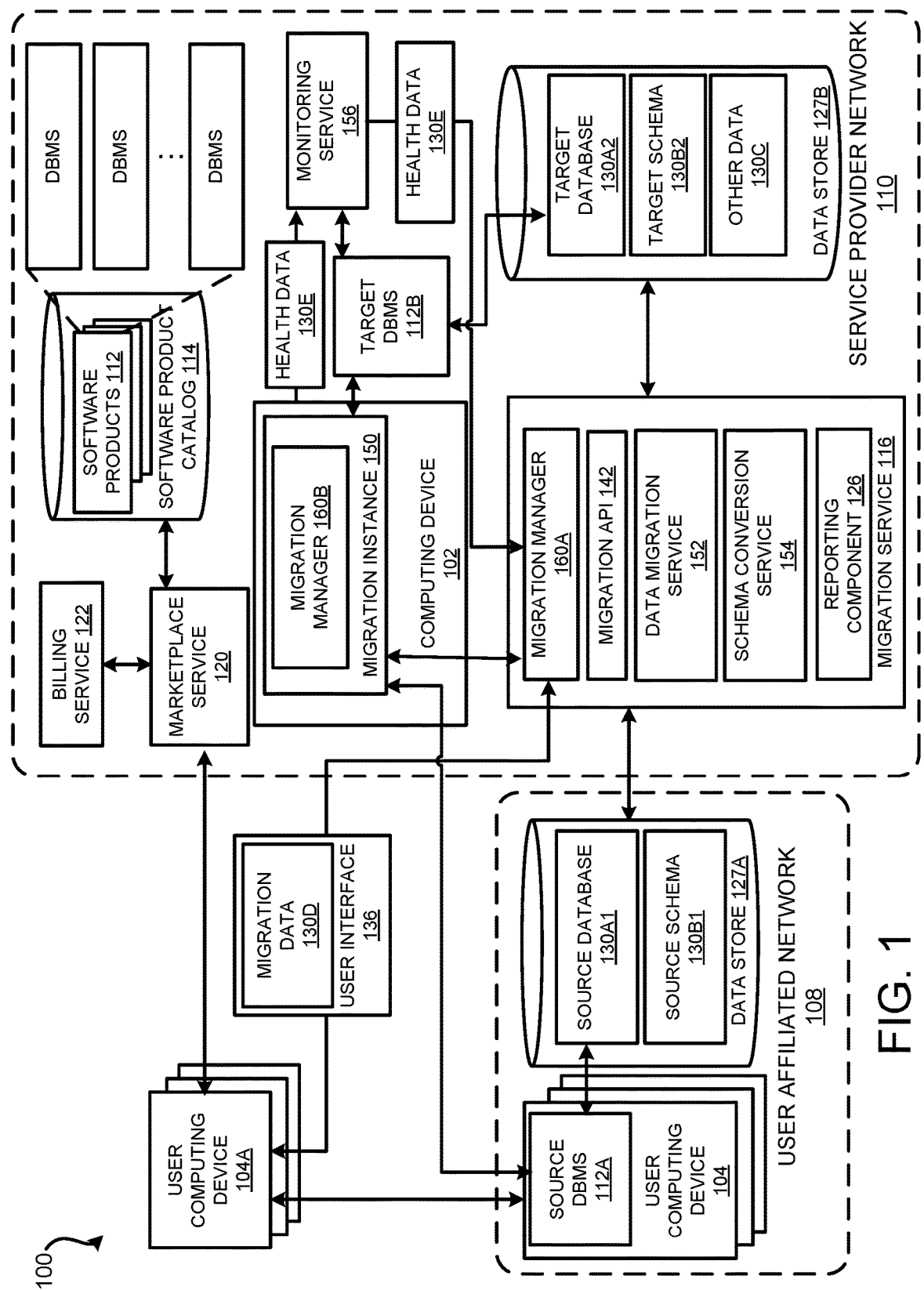
FIG. 1 is a computing system architecture diagram depicting an illustrative operating environment in which data is migrated between a source database and a target database.

The following detailed description is directed to technologies for migrating data between databases. In some configurations, a database migration service executing within a service provider network is used to migrate data from a source database executing within a user network to a target database executing within the service provider network. A database can be any collection of data. The source database and target database may be the same type of database which might be referred to herein as a "homogeneous migration" or different types of databases, which might be referred to herein as a "heterogeneous migration". Stated another way, the source database and the target database may be created using the same DBMS, or a different DBMS. A DBMS is a software product that manages databases and allows a user to create, edit and delete databases, tables and the data within the tables. As an example, the database migration service may migrate data from a database created using the DATABASE 12C DBMS from ORACLE CORPORATION to another DATABASE 12C database during a homogeneous migration, and from a database created using the DATABASE 12C DBMS from ORACLE CORPORATION to a database created using the AMAZON AURORA DBMS from AMAZON.COM, INC. during a heterogeneous migration. Similarly, a database created using the MICROSOFT SQL SERVER DBMS from MICROSOFT CORPORATION can be migrated to another database created using the MICROSOFT SQL SERVER DBMS during a heterogeneous migration.

According to some examples, the source DBMS remains operational during the migration of the data from the source database to the target database, thereby minimizing downtime to applications that rely on the source database. In some configurations, an entity may continue to utilize the source DBMS during the migration, as well as after the migration. For instance, for some period of time after the migration has completed the database migration service may continue to migrate changes made to the source database and/or the target database.

Instead of an entity having to pay a software consultant a large amount of money to migrate data from one database to another, or spending a lot of time, a user of the database migration service disclosed herein may begin a database migration by selecting a few options from a user interface or API. In some examples, the user creates one or more migration tasks that define the set of information used by the database migration service to execute the migration. For instance, the user may provide connection information to the source and the target DBMSs as well as setting options to continue or stop the migration of changes after the database has been migrated.

According to some configurations, the user may choose a computing resource on which the migration process is performed using the functionality provided by the database migration service. For example, the user may select a migration instance, such as a virtual machine instance, that runs in a service provider network to perform the migration on behalf of the user. After the setup is complete, the user may begin the database migration with the click of a button or using an API. Once the migration has started, the database migration service manages the complexities of the migration process for the user. In some configurations, the database migration service performs data type transformations, and other operations while ensuring that data changes to the source database that occur during the migration process are automatically migrated to the target. Since data changes to the source database that occur during the migration are migrated to the target by the database migration service, the source database remains operational during the migration process.

In some examples, the database migration service monitors the source and target database management systems, network connectivity, and the migration instance during the migration. When a problem is detected, the database migration service attempts to resolve the problem without user interaction. For example, the database migration service may restart the migration process and continue the migration of data from the point in time the problem was detected. In case of problems that cannot be automatically resolved, the database migration service may present detailed diagnostic information to the user.

After the initial database migration is complete and the data has been transferred, the database migration service may continue to migrate changes made to the source database to the target database. In some examples, the user may specify for the target database to remain synchronized with the source database from some period of time after the data has been migrated. This allows a user to switch applications from the source database to the target database at a convenient time, thereby reducing risk and minimizing any application downtime. In some cases, both databases may continue to be used by the user.

Heterogeneous database migrations are generally very complex, difficult, and time consuming. For instance, the source and target databases may use different formats for schema objects, as well as different syntax and language structures for the code used in stored procedures and functions. Because of these differences in format, the schema objects in the source database are to be converted to a format that is compatible with the target database before migrating the data that utilizes these incompatible formats.

To assist a user in heterogeneous migrations, the database migration service includes a schema conversion service in one configuration that attempts to convert, without user intervention, the source database schema and code, including views, stored procedures and functions, to a format compatible with the target DBMS. Any code that cannot be automatically converted is marked to assist the user of the database migration service identify where manual re-coding is required.

According to some configurations, the database migration service provides recommendations as to a target DBMS that is a suitable target DBMS for the migration. For example, one or more of the target database management systems may require a large amount of changes to the schema and code in order to support the features of the source DBMS. The user may select the target DBMS that is identified to need the fewest changes or some other DBMS that requires less effort than some other possible target database.

In some cases, the database migration service highlights the locations in the source code that cannot be programmatically converted and displays a code browser that directs the user to these locations. According to some configurations, the database migration service provides recommendations that allow the user to implement the features of the source DBMS that do not have direct equivalents in the target DBMS. Additional details regarding the various components and processes described above relating to migrating data between databases will be presented below with regard to FIGS. 1-10

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances and the like. As mentioned briefly above, the examples described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific examples or examples. The drawings herein are not drawn to scale. Like numerals represent like elements throughout the several figures (which may be referred to herein as a "FIG." or "FIGS.").

FIG. 1 is a computing system architecture diagram depicting an illustrative operating environment 100 in which data is migrated between a source database and a target database. As illustrated in FIG. 1, the operating environment 100 includes one or more user computing devices 104 in communication with a service provider network 110 and a user affiliated network 108.

A software provider, using a software provider-computing device (not shown), may submit one or more software products 112 for inclusion in an online software product catalog 114. For example, the software products 112 might be applications that are available for download and use on a user computing device 104. Alternately, the software products 112 may be virtual machine images or other types of software components that may be executed on computing resources provided by the service provider network 110. For example, different DBMS software products 112 (which may be referred to herein as "DBMS 112" in the singular or "DBM 112" in the plural) may be configured to execute within the service provider network 110, within the user affiliated network 108, and/or on some other computing device, such as a user computing device 104. In some examples, the software provider is a third party software provider that is not an owner/operator of the service provider network 110.

As used herein, the term "software product" may refer to software and/or software services. For example, a software product may be an application, a machine image, or software as a service ("SaaS"). The software product may be available from an electronic marketplace and may be executed on a user computing device and/or within a service provider network or some other network. As used herein, a "purchase" or "acquisition" of the software product may result in no payments from the user (e.g., free), a one-time payment from a user, or payments from a user that are made on an ongoing basis depending upon how the software is utilized and executed. In some examples, a purchase of a software product establishes a subscription or license to the software product that allows the user to execute the software product.

A user might purchase a software product from an electronic marketplace and install the software product on a computing device. In other examples, a user may execute a software product within a service provider network.

At some point after submission of the software products 112, the service provider network 110 may make the software products 112 available to users. As used herein, the terms "user" and "users" refer to existing users or customers of the service provider network 110 as well as visitors (i.e. potential customers) to the service provider network 110. A user, using a user computing device 104, may access an electronic marketplace (not shown) to browse and acquire or purchase software products 112.

After acquiring the software product 112, the user may configure the software product 112 and launch the software product 112 for execution. In some examples, the software product 112 may be downloaded from the service provider network 110 and executed on a user computing device 104. In other examples, the software product 112 executes in the service provider network 110 or some other location, such as the user affiliated network 108.

As described in more detail below, the service provider network 110 may include a collection of rapidly provisioned and, potentially, released computing resources hosted in connection with the electronic marketplace or a third party provider. The computing resources may include a number of computing, networking and storage devices in communication with one another. In some examples, the computing resources may correspond to physical computing devices. In other examples, the computing resources may correspond to virtual machine instances or other types of execution environments implemented by one or more physical computing devices. In still other examples, computing resources may correspond to both virtual machine instances and physical computing devices.

The marketplace service 120, or some other computing device, may facilitate the purchase of the software product 112. In this regard, the marketplace service 120 may receive information from the user computing device 104. The marketplace service 120 may also establish an account or update an account for a user. The account information may include a variety of different information, such as one or more payment methods, billing preferences, address information, communication preferences, privacy preferences, and the like. This information might be obtained by the marketplace service 120 and provided to the billing service 122. The billing service 122 may also be configured to process payments from users and, in some examples, provide payment to the software providers of the software products 112.

As discussed above, a user, such as a user of the service provider network 110, may want to migrate data from one database (e.g., a source database 130A1) to another database (e.g., a target database 130A2). In some configurations, a migration service 116 provides functionality for migrating data from the source database 130A1 to the target database 130A2. The source DBMS 112A associated with the source database 130A1 and the target DBMS 112B associated with the target database 130A2 may be the same type of DBMS (e.g., a homogeneous migration) or different types of DBMS (e.g., a heterogeneous migration). For example, the migration service 116 may be used to migrate data from database created using a MICROSOFT SQL SERVER DBMS to another database created using a MICROSOFT SQL SERVER DBMS during a homogeneous migration. The migration service 116 may be used to migrate data from a database created using an ORACLE DBMS to a database created using the AMAZON AURORA DBMS or from a database created using the MICROSOFT SQL SERVER to a database created using the AMAZON AURORA DBMS during a heterogeneous migration.

According to some examples, the source DBMS 112A remains operational during the migration of the data from the source database 130A1 and the source schema 130B1 to the target DBMS 112B and the target schema 130B2. For example, the source DBMS 112A continues to receive and process requests from users that change the source database 130A1 (e.g., creating new records, deleting records). As such, the user may continue to utilize the source database 130A1, thereby minimizing downtime to applications that rely on the data in the source database 130A1. In some configurations, a user may continue to utilize the source DBMS 112A and the source database 130A1 during the migration, as well as after the migration. For instance, after the migration, the migration service 116 may continue to migrate changes made to the source database 130A1 and/or the target database 130A2.

A user may begin a database migration by selecting a few options from a user interface, such as from user interface 136 or using an API. According to some configurations, the migration service 116 provide to a user computing device 104A migration data 130D within a user interface 136 (e.g., a "GUI"). In some examples, the user interface 136 may include a display of user interface elements that allow the user to create a migration task. The migration task defines the set of information used by the database migration service 116 to execute the migration. For instance, the user may provide connection information to the source and the target databases as well as setting options to continue or stop the migration of changes after the data have been migrated. As an example, a user may provide user credentials to the migration manager 160A such that the migration service 116 may perform operations involving the source database 130A1 and the target database 130A2. The user might also specify the network locations of where the source database and the target database are located. These options may also be specified via an API.

According to some configurations, the user may choose a computing resource in which the migration process will run. For example, the user may select (e.g., using the user interface 136 or an API) a virtual machine instance that runs in the service provider network 110 and is used to perform the migration using functionality provided by the migration service 116. In some configurations, the migration manager 160A within the migration service 116 may recommend a size for a virtual machine instance based on various performance criteria, such as the size of the data to migrate and how quickly the user wants the migration to occur. According to some examples, the user selects a size of virtual machine instance. Generally, the larger the size of the virtual machine instance, the more processing power the virtual machine instance has and the faster the migration occurs.

After the setup is complete, the user may begin the database migration by selecting a start option presented within the user interface 136 or using functionality exposed by the API. In some examples, before the data migration is started, the migration manager 160A may test the connections to the source DBMS 112A and the target DBMS 112B using the user-supplied connection information. According to some configurations, the migration manager 160A creates a migration instance 150 on a computing device, such as computing device 102 that performs the migration on behalf of the user. As illustrated, the migration instance 150 is a virtual machine instance that includes a migration manager 160B that utilizes a migration Application Programming Interface ("API") 142 exposed by the migration service 116 to communicate with the migration service 116. Once the migration has started, the migration instance 150, in conjunction with the migration manager 160B and/or migration manager 160A, manages the complexities of the migration process for the user.

In some configurations, the migration service 116 is used to perform data type transformations, and other operations while ensuring that data changes to the source database 130A1 that occur during the migration process are automatically migrated to the target database data 130A2 and/or the target schema 130B.

In some examples, a monitoring service 156 monitors the source DBMS 112A and the target DBMS 112B, network connectivity, and the migration instance 150 during the migration. The monitoring service 156 may provide health data 130E related to the migration process to the migration manager 160, the migration instance 150 and/or some other computing device or component. When a problem is detected (e.g., the migration instance 150 stopped working), the migration manager 160B and/or the migration manager 160A in the database migration service 116 attempts to resolve the problem without user interaction. For example, the database migration service 116 may restart the migration instance 150 and continue the migration of the database from the point in time the problem was detected. More details regarding monitoring and resolving detected problems is provided below with regard to FIG. 2. In case of problems that cannot be automatically resolved, the migration service 116 may present detailed diagnostic information to the user.

After the initial database migration is complete and the data has been migrated to the target database 130A2, the migration manager 160B can continue to migrate changes made to the source database 130A1 to the target database 130A2. For example, the user may specify during the creation of the migration task for the target database 130A2 to remain synchronized with the source database 130A1 for some period of time after the data has been migrated. This allows a user to switch applications from the source database to the target database at a convenient time, thereby reducing risk and minimizing any application downtime. In some cases, both databases may continue to be used by the user.

As discussed above, heterogeneous database migrations are generally very complex, difficult, and time consuming. For instance, the source and target databases may use different formats for schema objects, as well as different syntax and language structures for the code used in stored procedures and functions. Because of these differences in format, the schema objects in the source database should be converted to a format that is compatible with the target database if the user wants to use those types of objects within the target database.

To assist a user in heterogeneous migrations, the migration service 116 includes a schema conversion service 154 that attempts to convert, without user intervention, the source schema and code, including views, stored procedures and functions (collectively referred to herein as "schema 130B"), to a format compatible with the target DBMS 112B and the target database 130A2. In some configurations, the conversion functionality is created for each supported database. For example, code to convert schema 130 used by an ORACLE DBMS to a MYSQL format, an AURORA format, and the like is developed for use by the schema conversion service 154. Unlike other schema conversion tools, however, the conversion functionality may be accessed via the migration service 116 that can be accessed via the migration API 142. In some configurations, the user computing device 104A may include a software product 112 (not shown) that accesses the functionality of the schema conversion service 154 within the migration service 116.

The schema conversion service 154 attempts to convert the source schema 130B into the target schema 130B2 without user interaction. In some examples, source schema 130B that cannot be programmatically converted by the schema conversion service 154 is identified to assist the user of the database migration service identify where manual re-coding is required. For example, the schema conversion service 154 may highlight the portions of the source schema 130B1 that may not be programmatically converted by the schema conversion service 154 and provide this data within the user interface 136. In some cases, a code browser can be utilized within the user interface 136 to navigate the source schema 130B1 that may not be programmatically converted by the schema conversion service 154.

According to some configurations, the schema conversion service 154 that is part of the migration service 116 may also provide recommendations to the user indicating possible solutions to converting the source schema 130B1 to the target schema 130B2. For example, the schema conversion service 154 may provide recommendations that allow the user to implement the features of the source database engine that do not have direct equivalents in the target database. As an example, a recommendation might be provided to use a supported table of the target database 130A2 that most closely matches an unsupported schema object within the source schema 130B1.

In some configurations, functionality provided by the migration service 116 is accessed using a migration API 142 that may be a Web API that access functionality of the migration service 116 and possibly other services accessible within the service provider network 110 and/or other web services provided by the service provider network 110. In the current example, the migration manager 160B that is executing within the migration instance 150 utilizes the migration API 142 to interact with the migration service 116. The migration API 142 might also be used to request data from one or more DBMS 112 and/or other software products 112, and the like. Some exemplary APIs include, but are not limited to specifying a source database, specifying a target database, creating a new migration task, editing a migration task, deleting a migration task, starting a migration task, stopping a migration task, starting a migration instance, stopping a migration instance, establishing or changing mappings between schema, checking metrics associated with the migration (e.g., memory use, disk use, processor use), and the like.

In some examples, a reporting component 126 that may be part of the migration service 116 provides migration data 130D to the user. The migration data 130D may include various types of information such as, but not limited to how much data was migrated, how compatible the source schema 130B1 is with the target schema 130B2, and the like.

Figure 2:
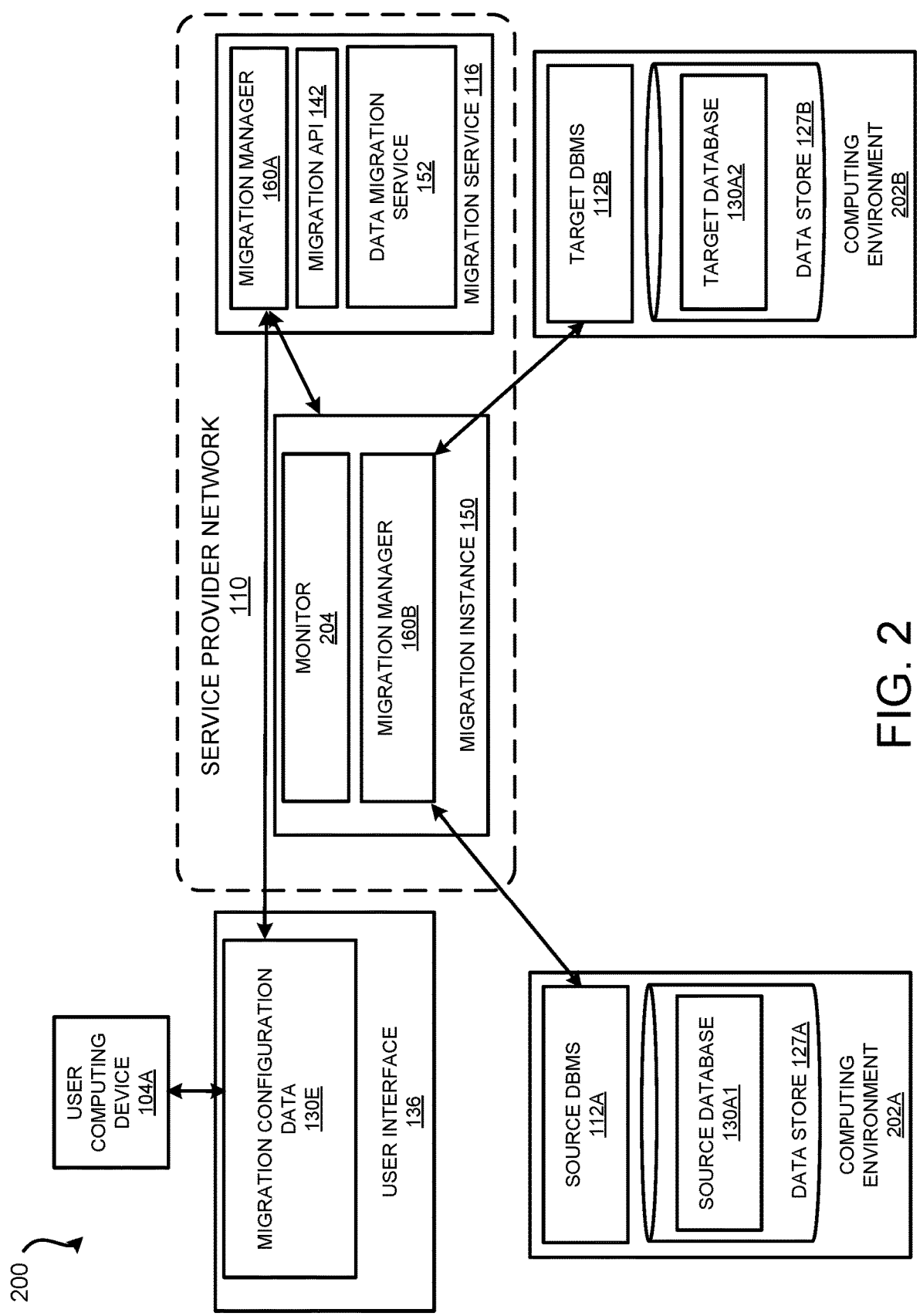
FIG. 2 is a computing system architecture diagram depicting an illustrative operating environment in which a database migration service migrates data from a source database to a target database.

FIG. 2 is a computing system architecture diagram depicting an illustrative operating environment 200 in which a database migration service 116 is used to migrate data from a source database 130A1 to a target database 130A2. As illustrated in FIG. 2, the operating environment 200 includes the migration service 116, and the migration instance 150 that operates in the service provider network 110. The migration instance 150 is coupled to the source DBMS 112A and the target database DBS 112B.

In the example illustrated in FIG. 2, the source DBMS 112A is operating within a computing environment 202A and the target DBMS 112B is operating in a computing environment 202B. The computing environment 202A and the computing environment 202B may be different computing environments (e.g. different networks) or they may be the same computing environment (e.g., the same network). For example, the computing environment 202A may be the user affiliated network 108, the service provider network 110, or some other network or computing environment. Similarly, the computing environment 202B may be the user affiliated network 108, the service provider network 110, or some other network or computing environment.

As discussed briefly above, the migration manager 160A may provide migration configuration data 130E within the user interface 136. In some examples, the user interface 136 includes selectable user interface elements that allow a user to select or specifies the source DBMS 112A and provides connection information for connecting to the source DBMS 112A. The user also selects or specifies the target DBMS 112B. In some examples, the user may specify the connection information to the target DBMS 112B and/or the migration service 116 may establish the connection to the target DBMS 112B when the target database is within the service provider network 110, or some other known network.

In some examples, the user may test the connection to the source DBMS 112A and/or the target DBMS 112B. For instance, the user may select a "test connection" UI element (not shown) to have the migration manager 160A test the connections. The user may also specify a computing resource that is to perform the migration of the data. In some configurations, the user selects from different sized virtual machine instance types (e.g. small, medium, large) that provide different processing and memory capabilities. Generally, larger sized virtual machine instances will migrate the data more quickly as compared to smaller sized virtual machine instances.

As discussed above, the migration manager 160 creates a migration instance 150 for execution within the service provider network 110. In some configurations, the migration instance 150 may be provided by an on-demand computing service that provides computing resources as needed. The migration instance 150 performs the migration of the data from the source database 130A1 to the target database 130A2 using the functionality exposed by the migration service 116. The migration manager 160B may utilize functionality provided by the database migration service 116 to perform data type transformations, and other operations during the migration of the data from the source database 130A1 to the target database 130A2.

In some examples, a monitor 204, or some other monitoring service (e.g. monitoring service 156 shown in FIG. 1) monitors the operation of the source DBMS 112A, the target DBMS 112B, network connectivity, and the like. In some configurations, the migration manager 160A may monitor the migration instance 150. The monitor 204 may notify the migration manager 160B and or the migration manager 160 when a problem is detected. For example, the monitor 204 may determine that a connection to one or more of the source DBMS 112A or the target DBMS 112B has been lost.

When a problem is detected, the migration manager 160B and/or the migration manager 160A attempts to resolve the problem without user interaction. For example, the migration manager 160B may re-establish a connection with the database to which the connection was lost, and continue the migration of the database from the point in time the problem was detected. In case of problems that cannot be automatically resolved, the migration service manager 130B and/or the migration manager 160A may present detailed diagnostic information to the user.

Figure 3:
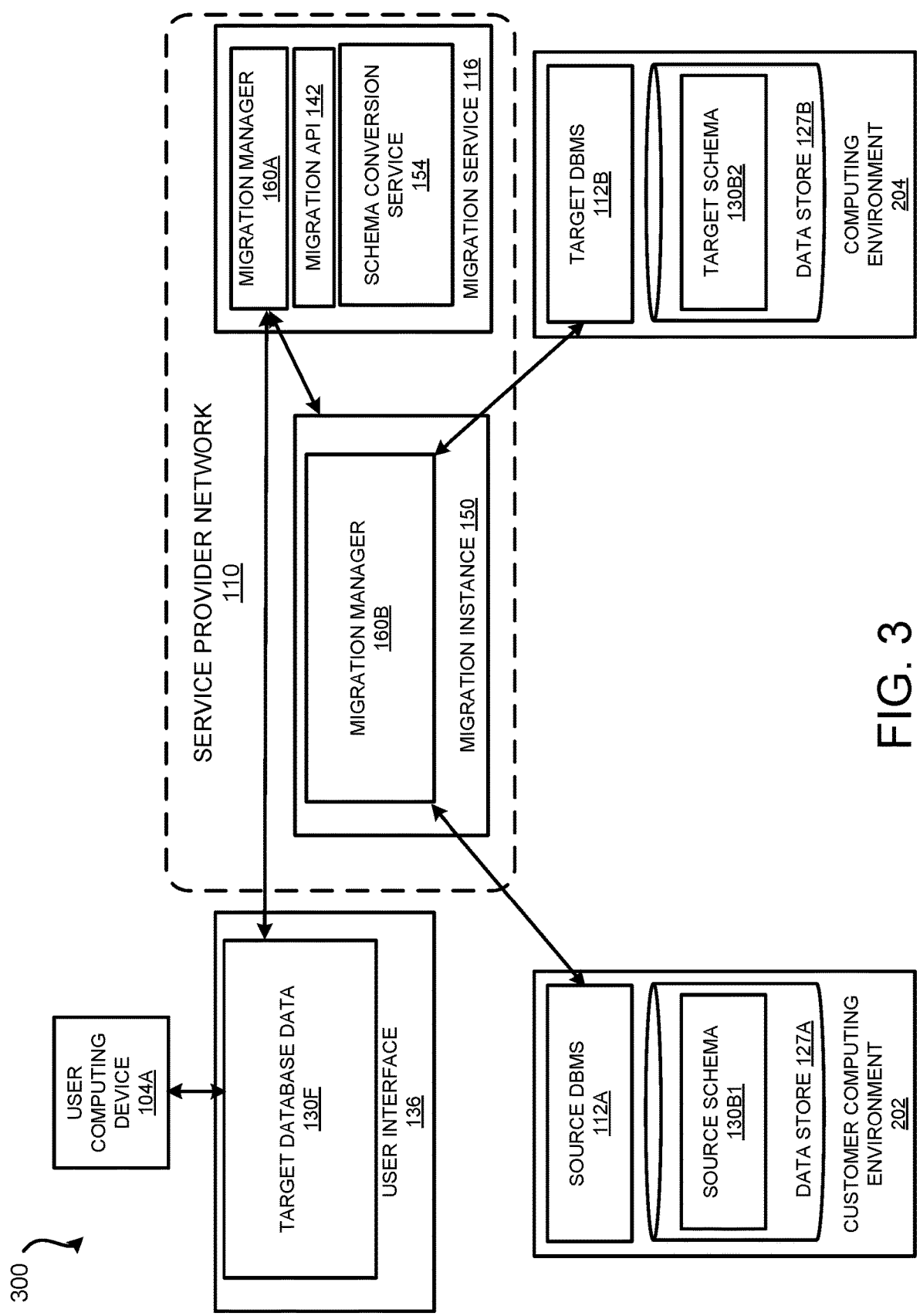
FIG. 3 is a computing system architecture diagram depicting an illustrative operating environment in which a schema migration service converts schema associated with a source database to a compatible schema of a target database.

FIG. 3 is a computing system architecture diagram depicting an illustrative operating environment 300 in which source schema is converted to target schema. As illustrated in FIG. 3, the operating environment 300 includes the migration service 116, and the migration instance 150 that operates in the service provider network 110. The migration instance 150 is coupled to the source DBMS 112A and the target DBMS 112B.

As discussed above, heterogeneous database migrations use different formats for schema objects, as well as different syntax and language structures for the code used in stored procedures and functions. The schema conversion service 154 provides functionality for converting the source schema 130B1 to the target schema 130B2. For example, the migration manager 160B may access functionality provided by the schema conversion service 154 to convert the schema objects associated with the source DBMS 112A to schema objects supported by the target DBMS 112B.

In some examples, the migration manager 160A or the schema conversion service 154 may provide a recommendation as to which target database is the most suitable target database for the migration. For example, the schema conversion service 154 may determine the target DBMS 112 from a group of different DBMSs 112 that require the least amount of user effort when migrating. For instance, some of the available target DBMs 112 may require a small amount of user effort to convert the source schema 130B1 to the target schema 130B2, whereas other target DBMSs 112 may require a large amount of user effort to convert.

In some examples, the schema conversion service 154 compares the schema objects, as well as different syntax and language structures for the code used in stored procedures and functions supported by the source DBMS 112A with the objects and code supported by the target DBMS 112B. In some examples, the migration manager provides target database data 130F for display within the user interface 136 that relates to selecting a target DBMS based on the compatibility of the source schema with target schema. An exemplary GUI illustrating providing the user with the effort to migrate to different target DBMSs is illustrated in FIG. 4.

Once the target DBMS is selected, the migration manager 160B, in conjunction with the schema conversion service 154, attempts to convert, without user intervention, the schema 130B1 to a format compatible with the target DBMS 112B. As discussed above, any source schema 130B1 that cannot be programmatically converted without user interaction may be marked and presented within the user interface 136, or some other interface, such that a user can clearly see where manual re-coding is required.

Figure 4:
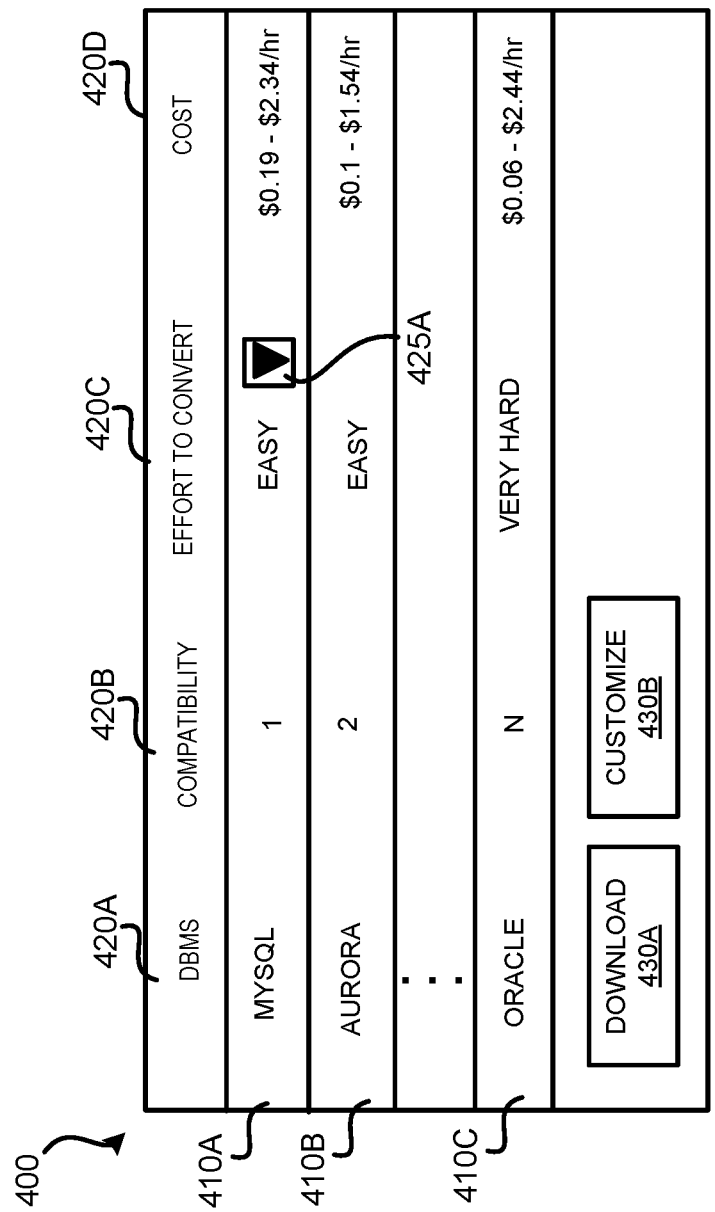
FIG. 4 is a screen diagram showing an illustrative graphical user interface ("GUI") that displays migration data relating to migrating from one database to another database.

Turning now to FIG. 4, an example of a graphical user interface ("GUI") is illustrated that displays the data relating to a migration of databases. The GUI that is presented is for illustrative purposes only, and is not intended to be limiting.

FIG. 4 is a screen diagram showing an illustrative GUI 400 that displays migration data relating to migrating data from one database to another database. The GUI 400 may be generated by the migration service 116, shown in FIG. 1, and presented on a display of a computing device, such as the user computing device 104 by an application, such as a web browser.

As illustrated, the GUI 400 includes rows corresponding to different DBMS software products 112 configured to execute in one or more of the service provider network 110, the user affiliated network 114, or some other computing device. In some examples, the DBMS software products 112 are configured to execute within the service provider network 110.

In the current example, the GUI 400 includes a display of a row (e.g., rows 410A-410C) for each DBMS software product 112 that is available as a target DBMS. Each row may include a column 420A for displaying a name of the DBMS software product, a column 420B for indicating the estimated compatibility of the DBMS software product 112 with the source database, a column 420C indicating an estimated amount of effort to convert to the database, and a column 420D indicating a cost per hour to execute the referenced database product.

In the current example, the GUI 400 shows a row 410A for a MYSQL DBMS software product 112, a row 410B for the AMAZON AURORA DBMS software product 112, and a row 401C for an ORACLE DBMS software product 112. As can be seen by referring to each of the rows 410A-410C, a software provider may view how compatible a DBMS product 112 is with a source database, as well as other information relating to migrating to a particular DBMS 112. A user might view how compatible a DBMS product 112 is with the source DBMS (e.g., compatibility column 420B), how much effort is required to convert the source schema to the target DBMS software product 112 (e.g., effort to convert column 420C), and the cost to execute the target DBMS software product 112 in the service provider network 110 (e.g., cost column 420D).

Viewing the row 410A that is associated with the MYSQL DBMS software product 112, the user may see that the MYSQL DBMS software product 112 is ranked as the most compatible database and that the effort to convert is classified as "easy". The user may also see the price range to execute the MYSQL DBMS software product 112 in the service provider network 110. The user might also compare the compatibility, the effort to convert, and the cost of the MYSQL DBMS software product 112 with other DBMS software products 112.

In some configurations, a user might be permitted to obtain more information about a DBMS software product 112. For example, the user might select the drill down UI element 425A to obtain more detailed information relating to the effort to convert the database. For example, in response to selecting the drill down UI element 425A more detailed information may be provided indicating how much time is estimated to convert the source schema to the target schema.

A user, such as a user of the service provider network 110, might also be able to customize the GUI 400 by selecting the customize UI element 430B. In response to selecting the customize UI element 430B, a user may then be prompted to select the information that they would like to include in the display of the GUI 400. For example, a user may select from a list (or some other UI element or input method) the data that they would like displayed. As an example, the data selected might be ratings data, popularity data, review data, or the like. In another example, the user may select how the data is to be displayed within the GUI 400. For example, the user may request to have a portion of the data displayed as raw data, another portion of the data displayed as a graphical representation (e.g., tables, charts, graphs), or displayed or provided in some other format.

The information presented in the GUI 400 might also be downloaded for later use. As illustrated, a user may select the download UI element 430A to download the data presented in the GUI 400 to a local data store, a network data store, or to another location.

Figure 5:
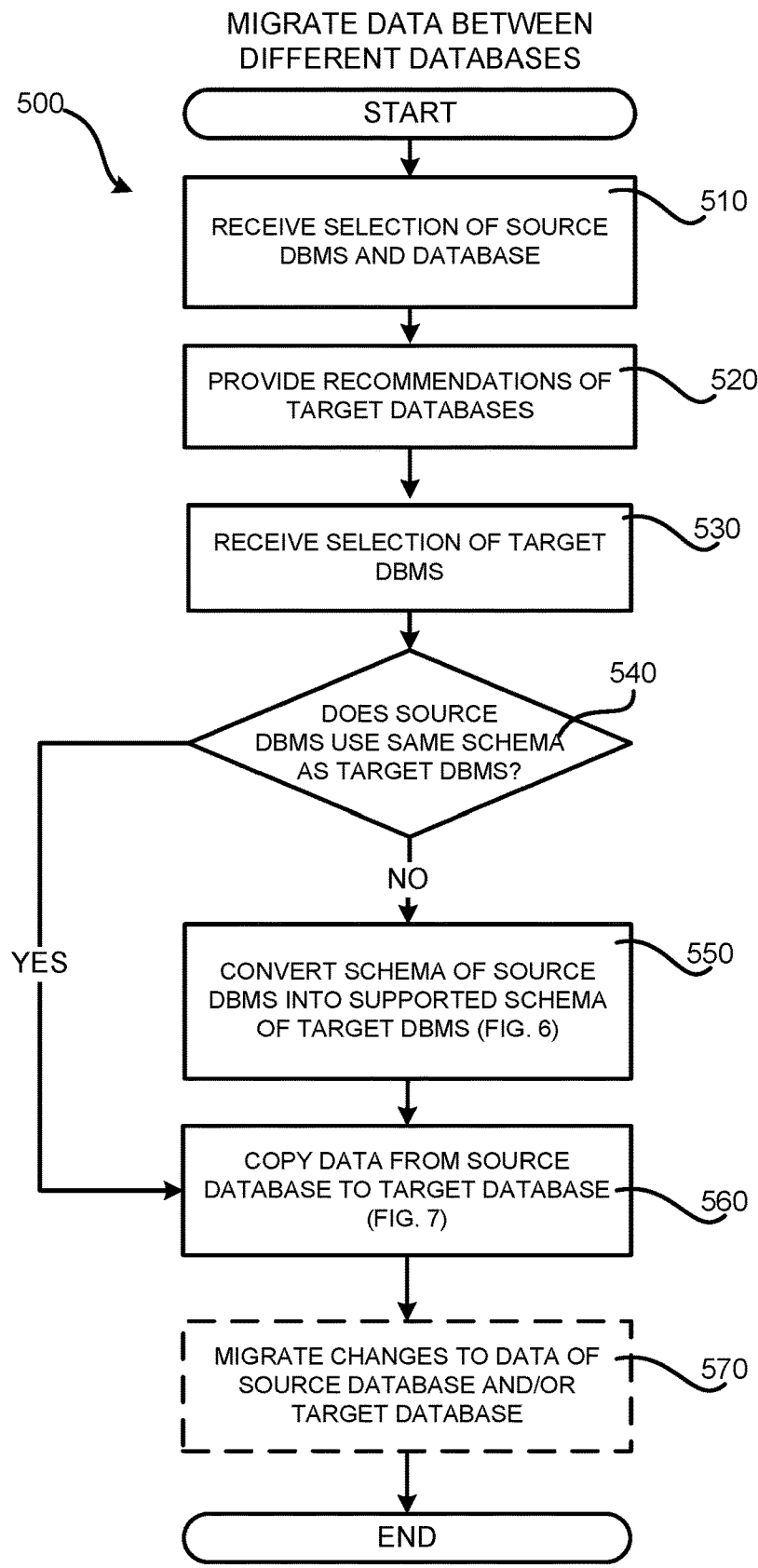
FIG. 5 is a flow diagram showing a routine illustrating aspects of a mechanism disclosed herein for migrating data between different databases.
Figure 6:
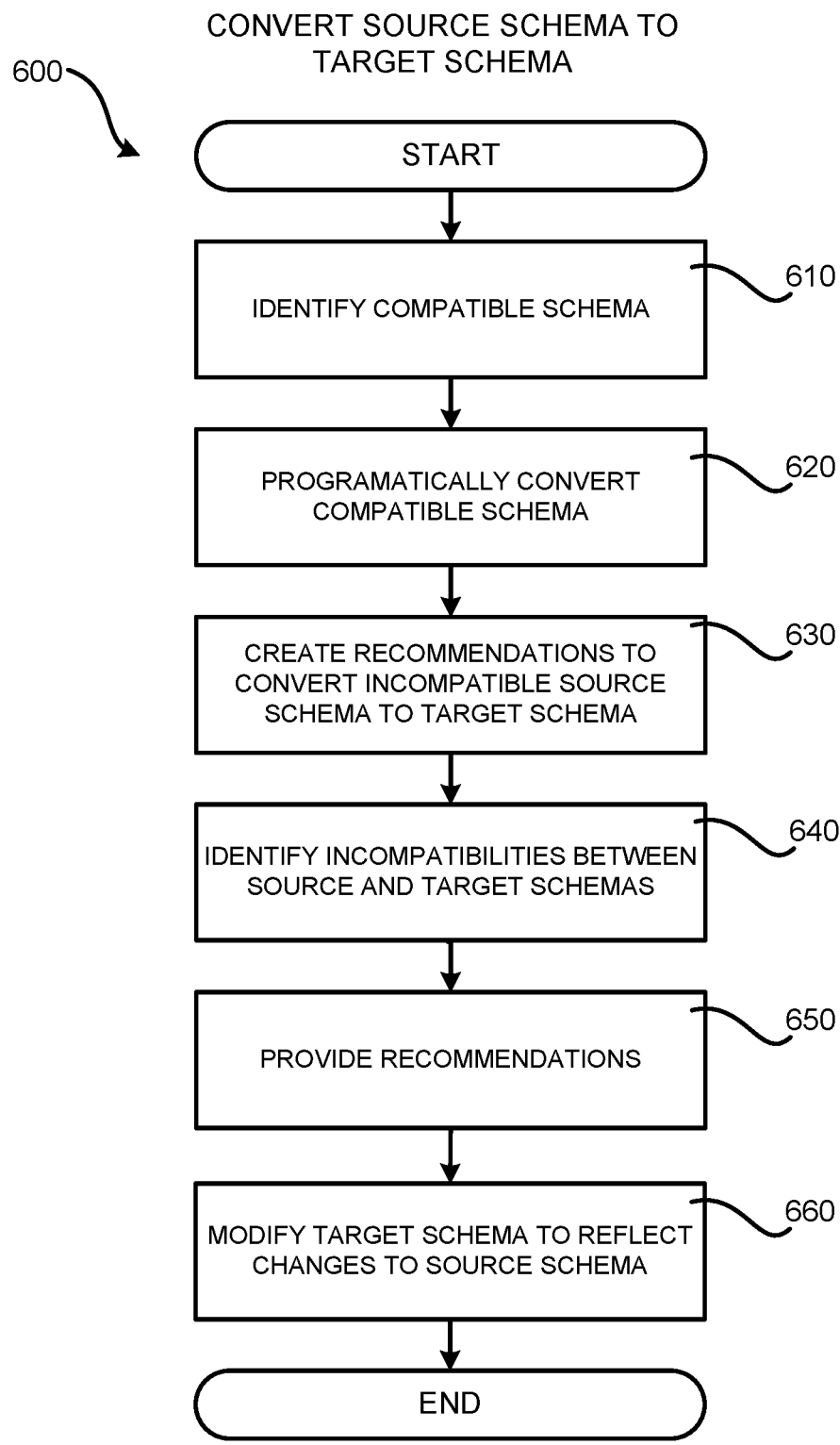
FIG. 6 is a flow diagram showing a routine illustrating aspects of a mechanism disclosed herein for converting source schema to a target schema.
Figure 7:
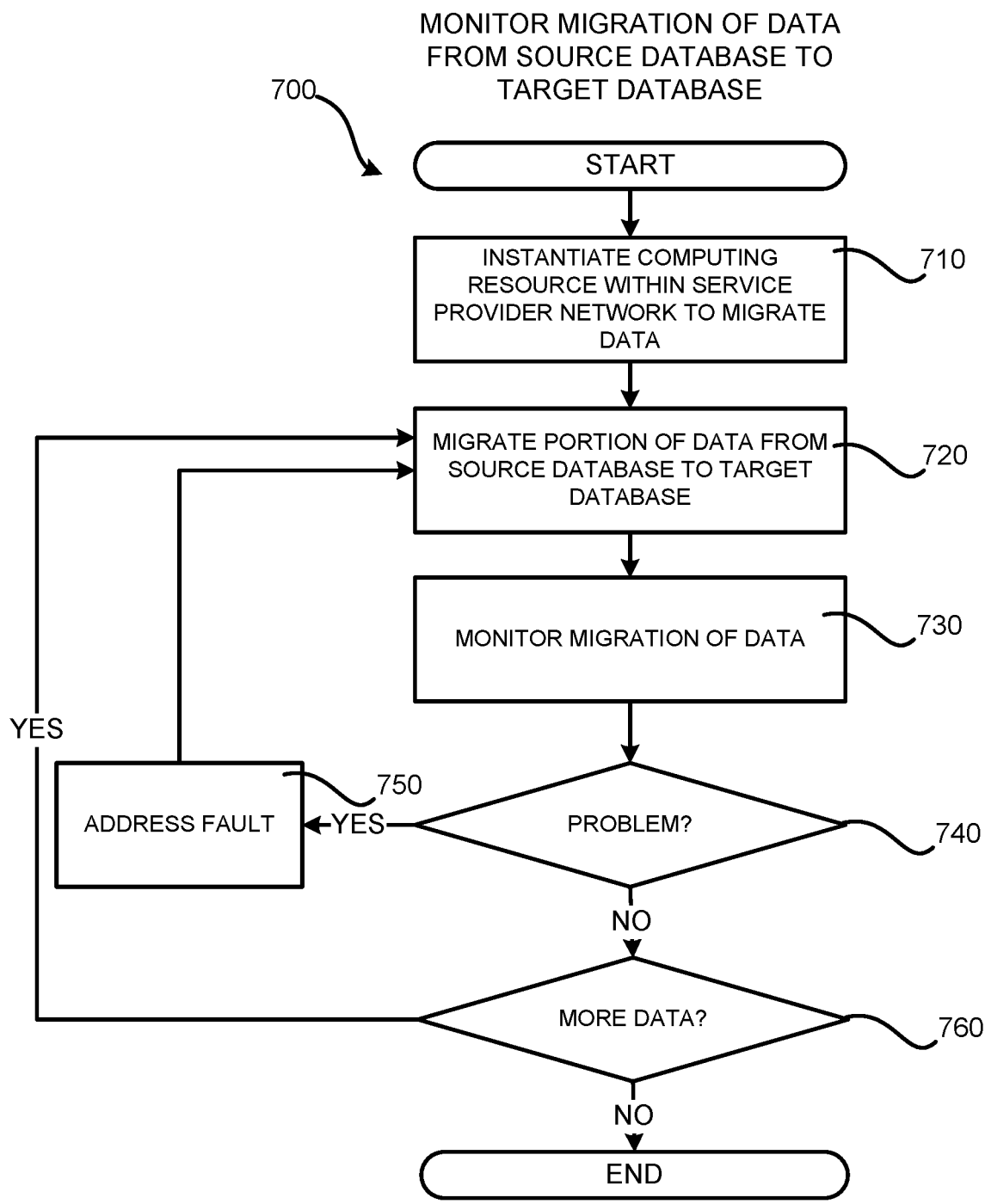
FIG. 7 is a flow diagram showing a routine illustrating aspects of a mechanism disclosed herein for monitoring the copying of data from a source database to a target database.

FIGS. 5-7 are flow diagrams showing routines that illustrate aspects of migrating data between databases. It should be appreciated that the logical operations described herein with respect to FIGS. 5-7, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic and any combination thereof. It should also be appreciated that more or fewer operations may be performed than shown in the FIGS. and described herein. These operations may also be performed in parallel, or in a different order than those described herein.

FIG. 5 is a flow diagram showing a routine 500 illustrating aspects of a mechanism disclosed herein for migrating data between different databases. The routine 500 may begin at 510, where a selection of a source DBMS and database is received. As discussed above, a user may provide connection information to a source DBMS. In some examples, the source DBMS may be within a user affiliated network 114 or configured to execute within the service provider network 110. The source DBMS and database can be selected from many different databases. In some examples, the source DBMS may execute within the service provider network and in other examples, the source DBMS may execute in a customer affiliated network.

At 520, recommendations of target databases can be provided. As discussed above, the migration service 116 can identify target database management systems that require less effort to migrate the data as compared to other target database management systems. For example, the schema conversion service 154 can identify target DBMSs for selection based on how difficult the source schema to the target schema of each of the potential target database management systems is.

At 530, a selection of a target DBMS is received. As discussed above, a user may select a target DBMS software product 112 from available DBMS software products 112 configured to execute within the service provider network 110 and/or some other environment. In other examples, the user may provide connection information to a target DBMS. For instance, the target database may be within a user affiliated network 114.

At 540, a decision is made as to whether the schema for the source DBMS is the same as the target DBMS. As discussed above, unless the schema of the source DBMS is the same as the target schema, some conversion will be needed in order to migrate the data without data loss. When the schema is the same, the process 500 moves to 560. When the schema is not the same, the process 500 moves to 550.

At 550, the schema of the source DBMS is converted to a schema supported by the target DBMS is made. As discussed above, the schema conversion service may attempt to programmatically convert the schema from the source DBMS to the target DBMS without user interaction. In some examples, the user may be involved in updating the schema. More details regarding converting the schema are provided below with regard to FIG. 6.

At 560, the data from the source database is migrated to the target database. As discussed above, the migration instance 150 in conjunction with the database migration service 116 migrates the data from the source database to the target database. In some examples, the source DBMS remains operational (e.g., continues to receive and process read/write operations, as well as other types of operations) during the copying of the data. More details regarding the copying of the data are provided below with regard to FIG. 7.

At 570, changes made to the source database and/or the target database may be migrated after the initial migration of data from the source database to the target database. As discussed above, a user may specify that changes are to be migrated after the initial migration of data. In this way, the user may continue to use the source DBMS while at the same time having any changes reflected in the new target database. The routine 500 may then proceed to an end operation. Alternately, the routine 500 might proceed back to repeat some or all of the processing operations described above. For example, from 570, routine 500 may proceed back to 510.

FIG. 6 is a flow diagram showing a routine 600 illustrating aspects of a mechanism disclosed herein for converting a source schema to a target schema. The routine 600 may begin at 610, where the compatible schema is identified by the schema conversion service 154. As discussed above, the schema conversion service 154 programmatically examines the source schema, identifies supported features within the target schema, and begins a programmatic analysis of the source schema.

At operation 620, the source schema is programmatically converted to a compatible schema for the target database. As discussed above, the schema conversion service 154 programmatically changes the structures of the source schema to the supported structures of the target schema.

At operation 630, recommendations are created regarding the conversion of an incompatible source schema to a target schema. As discussed above, the schema conversion service 154 identifies portions of the source schema that are not compatible with the target schema and identifies possible options that may be used to support the features of the source schema.

At operation 640, any incompatibilities between the source schema and the target schema are identified. As discussed above, the schema conversion service 143 may identify the determined incompatibilities such that a user may visually see where in the source schema the incompatibilities exist.

At operation 650, the recommendations generated at 630 are provided. As discussed above, the schema conversion service 154 may identify the recommendations and the migration manager 160 may provide the recommendations for display on the user interface 136 of the user computing device 104A.

At operation 660, the target schema is modified to reflect changes made to the target schema. As discussed above, the user may incrementally make changes to the source schema to move the functionality of the source schema to the target schema. The schema conversion service 154 may receive the changes and make the changes to the target schema 130B1. The routine 600 may then proceed to an end operation. Alternately, the routine 600 might proceed back to repeat some or all of the processing operations described above. For example, from 660, routine 600 may proceed back to 610.

FIG. 7 is a flow diagram showing a routine 700 illustrating aspects of a mechanism disclosed herein for monitoring the migration of data from a source database 130A1 to a target database 130A2. The routine 700 may begin at 710, where a computing resource is instantiated within the service provider network 110 that is used to migrate the data. As discussed above, the migration manager 160A may instantiate a virtual machine instance within the service provider network 110 to perform the migration. In some examples, the instance that is created is based upon a selection by the user. For example, the user may select a large sized instance or a small sized instance.

At operation 720, a portion of the data from the source database is migrated to the target database. As discussed above, the database migration service 116 executing within the service provider network 110 may migrate a portion of the data from the source database to a target database. For instance, the database migration service may be utilized by the computing resource to migrate a predetermined number of tables or other objects from the source database 130A1 to the target database 130A2.

At operation 730, the migration of the data is monitored. As discussed above, the database migration service 116 may monitor the migration of the data to help ensure that the migration is completed. For instance, the database migration service may employ a monitoring service 156 that identifies the health of the instance and an amount of data that is migrated from the source database to the target database.

At operation 740, a decision is made as to whether a problem has been detected. As discussed above, when a problem is detected by the migration manager 160, the database migration service 116 may attempt to address the problem at operation 750. When a problem is not detected, the process 700 flows to 760.

At operation 750, the database migration service may address the problem. As discussed above, the migration manager 160 may restart the instance used for copying the data from the source database to the target database.

At operation 760, a decision is made as to whether more data is to be migrated. As discussed above, when the migration manager 160 determines that there is more data to be migrated, the process 700 returns to 720. When there is not more data be migrated, the process flows to an end operation.

Figure 8:
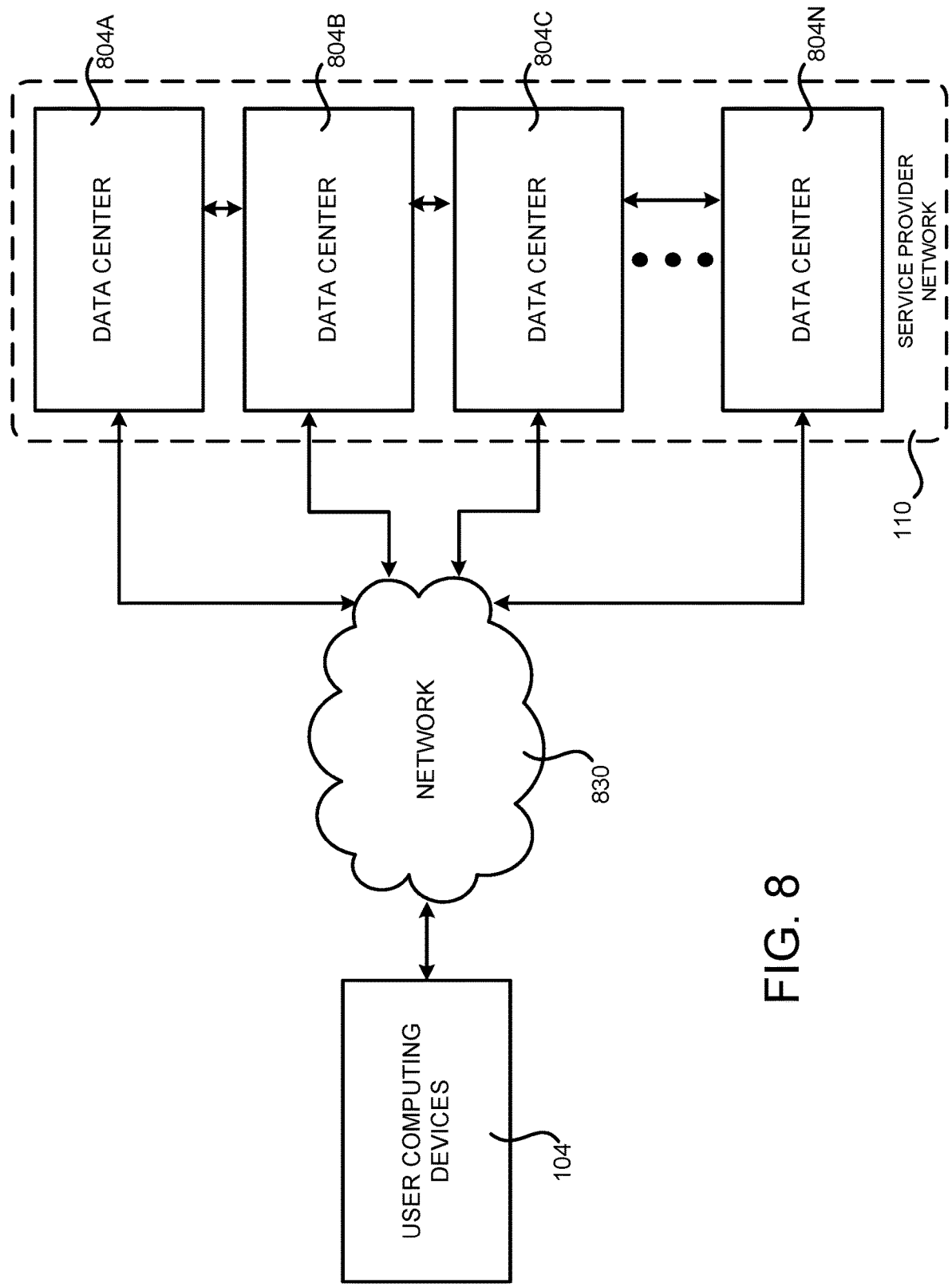
FIG. 8 is a system and network diagram that shows one illustrative operating environment for the examples disclosed herein that includes a service provider network.

FIG. 8 and the following description are intended to provide a brief, general description of a suitable computing environment in which the examples described herein may be implemented. In particular, FIG. 8 is a system and network diagram that shows an illustrative operating environment that includes a service provider network 110. As discussed above, the service provider network 110 can provide virtual machine instances and computing resources on a permanent or an as-needed basis.

The computing resources provided by the service provider network 110 may include various types of resources, such as data processing resources, data storage resources, networking resources, data communication resources and the like. Each type of computing resource may be general-purpose or may be available in a number of specific configurations. For example, and as will be described in greater detail below, data processing resources may be available as virtual machine instances in a number of different configurations. The virtual machine instances may be configured to execute applications, including Web servers, application servers, media servers, database servers and other types of applications. Data storage resources may include file storage devices, block storage devices and the like. Each type or configuration of a virtual machine instance of a computing resource may be available in different sizes, such as large resources, consisting of many processors, large amounts of memory, and/or large storage capacity, and small resources consisting of fewer processors, smaller amounts of memory and/or smaller storage capacity.

The computing resources provided by the service provider network 110 are enabled in one implementation by one or more data centers 804A-804N (which may be referred to herein singularly as "a data center 804" or collectively as "the data centers 804"). The data centers 804 are facilities utilized to house and operate computer systems and associated components. The data centers 804 typically include redundant and backup power, communications, cooling and security systems. The data centers 804 might also be located in geographically disparate locations. One illustrative configuration for a data center 804 that implements some or all of the concepts and technologies disclosed herein for annotating resources in the service provider network 110 will be described below with regard to FIG. 9.

The users and users of the service provider network 110 may access the computing resources provided by the data centers 804 over a suitable data communications network, such as a Wide Area Network ("WAN"), as illustrated by network 830. Although a WAN might be used, it should be appreciated that a local-area network ("LAN"), the Internet, or any other networking topology known in the art that connects the data centers 804 to the user computing devices 140, the software provider computing devices 150 may be utilized. It should also be appreciated that combinations of such networks might also be utilized.

Figure 9:
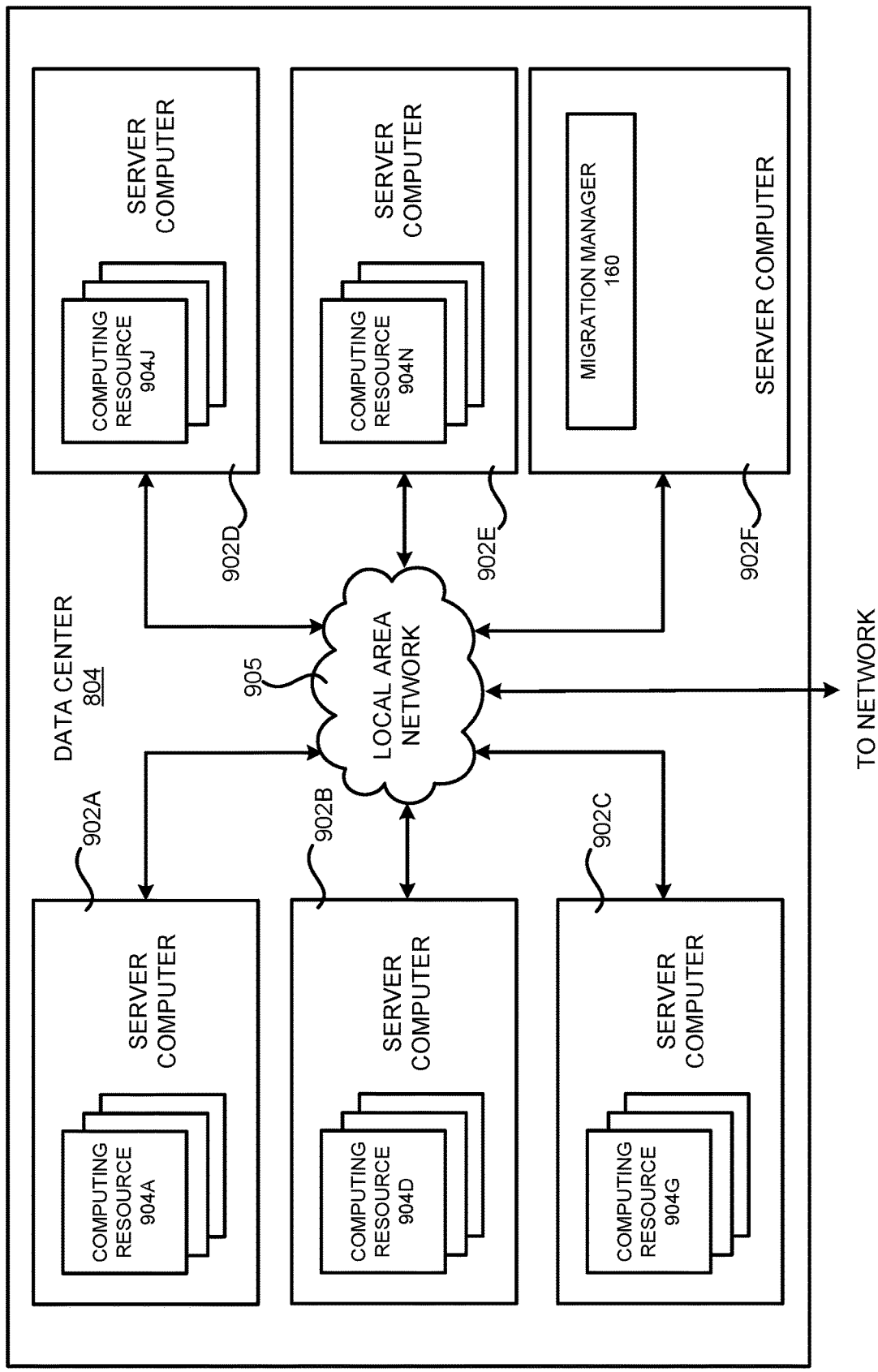
FIG. 9 is a computing system diagram that illustrates one configuration for a data center that implements aspects of a service provider network, including some or all of the concepts and technologies disclosed herein for migrating data between databases.

FIG. 9 is a computing system diagram that illustrates one configuration for a data center 804 that implements aspects of a service provider network 110, including some or all of the concepts and technologies disclosed herein for migrated data between databases. The example data center 804 shown in FIG. 9 includes several server computers 902A-902F (which may be referred to herein singularly as "a server computer 902" or in the plural as "the server computers 902") for providing computing resources. The server computers 902 may be standard tower or rack-mount server computers configured appropriately for providing the computing resources described herein. According to an example, the server computers 902 are configured to execute the software products as described above.

In one example, some of the computing resources 904 are virtual machine instances. As known in the art, a virtual machine instance is an instance of a software implementation of a machine (i.e. a computer) that executes programs like a physical machine. Each of the server computers 902 may be configured to execute an instance manager (not shown) capable of instantiating and managing computing resources and instances of computing resources. In the case of virtual machine instances, for example, the instance manager might be a hypervisor or another type of program configured to enable the execution of multiple virtual machine instances on a single server computer 902, for example.

It should be appreciated that although the examples disclosed herein are described primarily in the context of virtual machine instances, other types of computing resources can be utilized with the concepts and technologies disclosed herein. For instance, the technologies disclosed herein might be utilized with hardware resources, data storage resources, data communications resources, networking resources, database resources and with other types of computing resources.

The data center 804 shown in FIG. 9 also includes a server computer 902F reserved for executing software components for managing the operation of the data center 804, the server computers 902, virtual machine instances, and other resources within the service provider network 110. The server computer 902F might also execute the migration manager 160 and/or the migration service 116. Details regarding the operation of each of these components have been provided above. In this regard, it should be appreciated that while these components are illustrated as executing within the service provider network 110, computing systems that are external to the service provider network 110 might also be utilized to execute some or all of these components. Other configurations might also be utilized.

In the example data center 804 shown in FIG. 9, an appropriate local area network ("LAN") 905 is utilized to interconnect the server computers 902A-902E and the server computer 902F. The LAN 905 is also connected to the network 830 illustrated in FIG. 8. It should be appreciated that the configuration and network topology illustrated in FIGS. 8 and 9 has been greatly simplified and that many more computing systems, networks and networking devices may be utilized to interconnect the various computing systems disclosed herein. Appropriate load balancing devices or software modules might also be utilized for balancing a load between each of the data centers 804A-804N, between each of the server computers 902A-902F in each data center 804 and between virtual machine instances and other types of computing resources provided by the service provider network 110.

It should be appreciated that the data center 804 described in FIG. 9 is merely illustrative and that other implementations might also be utilized. Additionally, it should be appreciated that the functionality provided by these components might be implemented in software, hardware, or a combination of software and hardware. Other implementations should be apparent to those skilled in the art.

Figure 10:
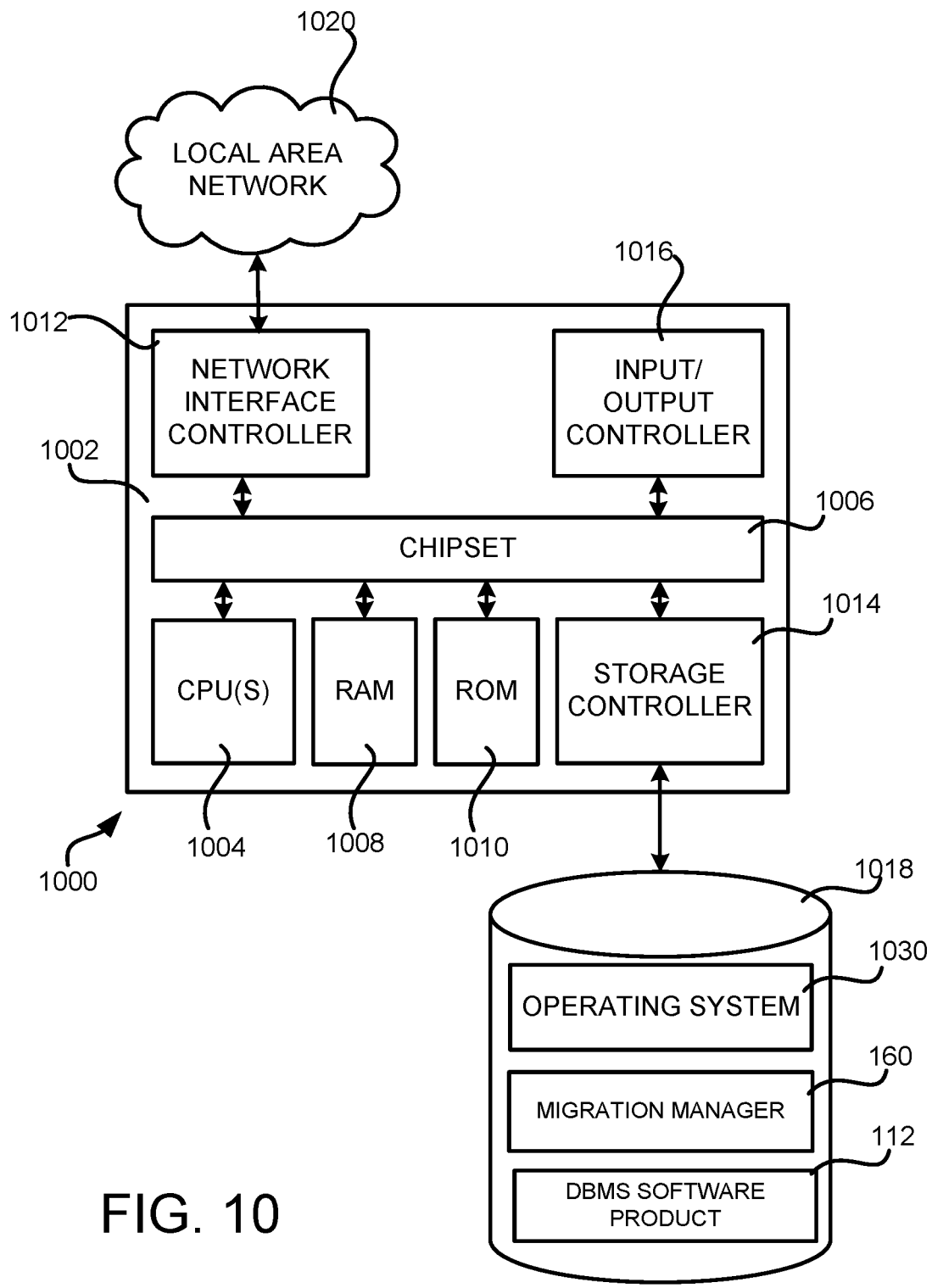
FIG. 10 is a computer architecture diagram showing one illustrative computer hardware architecture for implementing a computing device that might be utilized to implement aspects of the various examples presented herein.

FIG. 10 shows an example computer architecture for a computer 1000 capable of executing program components for migrating data between databases in the manner described above. The computer architecture shown in FIG. 10 illustrates a conventional server computer, workstation, desktop computer, laptop, tablet, network appliance, personal digital assistant ("PDA"), e-reader, digital cellular phone, or other computing device, and may be utilized to execute any of the software components presented herein. For example, the computer architecture shown in FIG. 10 may be utilized to execute software components for performing operations as described above. The computer architecture shown in FIG. 10 might also be utilized to implement a user computing device 140, a software provider computing device 150 or any other of the computing systems described herein.

The computer 1000 includes a baseboard 1002, or "motherboard," which is a printed circuit board to which a multitude of components or devices may be connected by way of a system bus or other electrical communication paths. In one illustrative example, one or more central processing units ("CPUs") 1004 operate in conjunction with a chipset 1006. The CPUs 1004 may be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements may generally include electronic circuits that maintain one of two binary states, such as flip-flops and electronic circuits that provide an output state based on the logical combination of the states of one or more other switching elements, such as logic gates.

These basic switching elements may be combined to create more complex logic circuits, including registers, adders-subtractors, arithmetic logic units, floating-point units and the like.

The chipset 1006 provides an interface between the CPUs 1004 and the remainder of the components and devices on the baseboard 1002. The chipset 1006 may provide an interface to a RAM 1008, used as the main memory in the computer 1000. The chipset 1006 may further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM may also store other software components necessary for the operation of the computer 1000 in accordance with the examples described herein.

The computer 1000 may operate in a networked environment using logical connections to remote computing devices and computer systems through a network, such as the local area network 1020. The chipset 1006 may include functionality for providing network connectivity through a network interface controller ("NIC") 1012, such as a gigabit Ethernet adapter. The NIC 1012 is capable of connecting the computer 1000 to other computing devices over the local area network 1020. It should be appreciated that multiple NICs 1012 may be present in the computer 1000, connecting the computer to other types of networks and remote computer systems.

The computer 1000 may be connected to a mass storage device 1018 that provides non-volatile storage for the computer. The mass storage device 1018 may store system programs, application programs, other program modules and data, which have been described in greater detail herein. The mass storage device 1018 may be connected to the computer 1000 through a storage controller 1014 connected to the chipset 1006. The mass storage device 1018 may consist of one or more physical storage units. The storage controller 1014 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 may store data on the mass storage device 1018 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1018 is characterized as primary or secondary storage and the like.

For example, the computer 1000 may store information to the mass storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 may further read information from the mass storage device 1018 by detecting the physical states or characteristics of one or more particular locations within the physical storage units.

In addition to the mass storage device 1018 described above, the computer 1000 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 1000.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 1018 may store an operating system 1030 utilized to control the operation of the computer 1000. According to one example, the operating system comprises the LINUX operating system. According to another example, the operating system comprises the WINDOWS® SERVER operating system from MICROSOFT Corporation. According to further examples, the operating system may comprise the UNIX operating system. It should be appreciated that other operating systems may also be utilized. The mass storage device 1018 may store other system or application programs and data utilized by the computer 1000, such as components that include the migration manager 160, the DBMS software product 112 and/or any of the other software components and data described above. The mass storage device 1018 might also store other programs and data not specifically identified herein.

In one example, the mass storage device 1018 or other computer-readable storage media is encoded with computer-executable instructions that, when loaded into the computer 1000, transform the computer from a general-purpose computing system into a special-purpose computer capable of implementing the examples described herein. These computer-executable instructions transform the computer 1000 by specifying how the CPUs 1004 transition between states, as described above. According to one example, the computer 1000 has access to computer-readable storage media storing computer-executable instructions which, when executed by the computer 1000, perform the various routines described above with regard to FIGS. 5-7. The computer 1000 might also include computer-readable storage media for performing any of the other computer-implemented operations described herein.

The computer 1000 may also include one or more input/output controllers 1016 for receiving and processing input from a number of input devices, such as a keyboard, a mouse, a touchpad, a touch screen, an electronic stylus, or other type of input device. Similarly, the input/output controller 1016 may provide output to a display, such as a computer monitor, a flat-panel display, a digital projector, a printer, a plotter, or other type of output device. It will be appreciated that the computer 1000 may not include all of the components shown in FIG. 10, may include other components that are not explicitly shown in FIG. 10, or may utilize an architecture completely different than that shown in FIG. 10.

Based on the foregoing, it should be appreciated that technologies for migrating data between databases have been presented herein. Moreover, although the subject matter presented herein has been described in language specific to computer structural features, methodological acts and computer readable media, it is to be understood that the invention defined in the appended claims is not necessarily limited to the specific features, acts, or media described herein. Rather, the specific features, acts and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example examples and applications illustrated and described, and without departing from the true spirit and scope of the present invention, which is set forth in the following claims.

What is claimed is:

1. A non-transitory computer-readable storage medium having computer-executable instructions stored thereupon which, when executed by a computer, cause the computer to:
receive, from a user computing device external to a service provider network, an indication of a selection of a source database associated with a source database management system (DBMS);
generate database recommendations that identifies target database management systems based, at least in part, on a compatibility of a source schema associated with the source DBMS and one or more target schemas associated with one or more of the target database management systems;
count, for each of the one or more target schemas, a number of changes needed to be made to an individual target schema of the one or more target schemas to enable the individual target schema to support a plurality of the features of the source DBMS;
generate classifications that indicate a level of effort associated with a user to convert the source schema to a target schema associated with individual ones of the database recommendations, wherein the level of effort is based, at least in part, on the counted number of changes;
provide, to the user computing device, data that identifies the database recommendations ranked based, at least in part, on the compatibility and the classifications;
receive, from the user computing device, a selection of a target database from the database recommendations, wherein the target database is associated with a target database management system (DBMS);
connect, from within the service provider network, to the source DBMS that is external to the service provider network;
connect, from within the service provider network, to the target DBMS; and
utilize functionality exposed by a migration application programming interface (API), provided by a migration service executing within the service provider network, to migrate data from the source database to the target database, wherein the source DBMS remains operational during the migration of the data.

2. The non-transitory computer-readable storage medium of claim 1, wherein the instructions further cause the computer to programmatically convert at least a portion of the source schema into a target schema associated with the target DBMS.

3. The non-transitory computer-readable storage medium of claim 1, wherein the instructions further cause the computer to monitor a health of the source DBMS and a health of the target DBMS.

4. The non-transitory computer-readable storage medium of claim 1, wherein the instructions further cause the computer to migrate changes made to the source database to the target database for a period of time after migration of the data.

5. The non-transitory computer-readable storage medium of claim 1, wherein the instructions further cause the computer to instantiate a virtual machine instance within the service provider network, and to utilize the virtual machine instance call functionality exposed by the migration API to migrate the data from the source database to the target database.

6. A system, comprising:
a data store operative to store data associated with a target database; and
one or more computing devices configured to operate in a service provider network, the one or more computing devices further configured to
generate database recommendations that identifies target database management systems based, at least in part, on a compatibility of a source schema associated with the source DBMS and one or more target schemas associated with one or more of the target database management systems,
count, for each of the one or more target schemas, a number of changes needed to be made to an individual target schema of the one or more target schemas to enable the individual target schema to support a plurality of the features of the source DBMS,
generate data that indicates a level of effort associated with a user to convert the source schema to the one or more target schemas based, at least in part, on the counted number of changes,
provide, to a computing device external to the service provider network, second data that identifies the database recommendations ranked based, at least in part, on the compatibility and the data,
receive, from the computing device external to the service provider network, an indication of a selection of a source database management system (DBMS) and a target DBMS, wherein the target DBMS is selected from at least a portion of the database recommendations, connect to the source database,
connect to the target database, and
migrate data from the source database to the target database using functionality provided by a migration service executing within the service provider network, wherein the functionality provided by the migration service is accessible by other computing resources within the service provider network.

7. The system of claim 6, wherein the source DBMS receives and processes read and write requests to the source database during the migration of the data.

8. The system of claim 6, wherein the one or more computing devices are further configured to programmatically convert, using a schema conversion service executing within the service provider network, at least a portion of the source schema into a target schema associated with the target DBMS.

9. The system of claim 6, wherein the one or more computing devices are further configured to monitor a health of the source DBMS and the target DBMS during the migration of the data from the source database to the target database.

10. The system of claim 9, wherein the one or more computing devices are further configured to resolve a detected problem based, at least in part, on the health of the source DBMS and the target DBMS and resume the migration of the data from the source database to the target database following resolution of the detected problem.

11. The system of claim 6, wherein the one or more computing devices are further configured to continue to migrate changes made to the source database after migration of an initial amount of data.

12. The system of claim 6, wherein the functionality provided by the migration service is functionality exposed by a migration application programming interface.

13. The system of claim 6, wherein the one or more computing devices are further configured to instantiate a computing resource within the service provider network, and to utilize the computing resource to interact with the migration service to migrate the data from the source database to the target database.

14. The system of claim 13, wherein a processing capability of the computing resource is specified by the user of the service provider network.

15. The system of claim 6, wherein the one or more computing devices are further configured to:
provide a graphical user interface that includes a user interface element that indicates the level of effort to convert the source schema into at least one of the one or more target schemas; and
at least partly in response to a selection of the user interface element, providing a display of an estimated amount of time to convert the source schema into the at least one of the one or more target schemas.

16. A computer-implemented method, comprising:
generating database recommendations that identifies target database management systems based, at least in part, on a compatibility of a source schema associated with a source DBMS and one or more target schemas associated with one or more of the target database management systems;
counting, for each of the one or more target schemas, a number of changes needed to be made to an individual target schema of the one or more target schemas to enable the individual target schema to support a plurality of the features of the source DBMS;
generating first data that indicates a level of effort of a user to convert the source schema to the one or more target schemas, wherein the level of effort is based at least in part on the counted number of changes;
providing, to a user computing device, second data that identifies the database recommendations ranked based, at least in part, on one or more of the compatibility and the first data;
receiving, from the user computing device, a selection of the source database management system (DBMS) and a target DBMS, wherein the target DBMS is selected from at least a portion of the database recommendations and is configured to execute within a service provider network;
connecting to the source DBMS from the service provider network;
connecting to the target DBMS from the service provider network; and
migrating data from a source database associated with the source DBMS to a target database associated with the target DBMS using functionality exposed by a migration application programming interface (API) provided by a migration service executing within the service provider network, wherein the source DBMS remains operational during and after the migration of the data.

17. The computer-implemented method of claim 16, further comprising accessing functionality of a schema conversion service executing within the service provider network to programmatically convert at least a portion of the source schema into a target schema associated with the target DBMS.

18. The computer-implemented method of claim 16, further comprising monitoring a health of a migration of the data from the source database to the target database.

19. The computer-implemented method of claim 16, further comprising identifying the level of effort to convert the source schema into at least one of the one or more target schemas and an estimated amount of time to convert the source schema into the at least one of the one or more target schemas.

20. The computer-implemented method of claim 16, further comprising:
instantiating a virtual machine instance within the network; and
using the virtual machine instance to connect to the migration service via the migration API to perform the migrating.

* * * * *